Feb. 24, 1970 R. DUNTHORNE 3,497,789
ELECTRICALLY OPERATED MECHANICAL BRAKE AND CIRCUIT
CONTROLLING APPARATUS WITH IMPROVED BRAKE MEANS
Filed April 8, 1965 2 Sheets-Sheet 1

WITNESSES:
John L. Chopp
James F. Young

INVENTOR
Raymond Dunthorne
BY
William A. Elchik
ATTORNEY

United States Patent Office 3,497,789
Patented Feb. 24, 1970

3,497,789
ELECTRICALLY OPERATED MECHANICAL BRAKE AND CIRCUIT CONTROLLING APPARATUS WITH IMPROVED BRAKE MEANS
Raymond Dunthorne, Port Credit, Ontario, Canada, assignor to Canadian Westinghouse Company, Limited, Hamilton, Ontario, Canada
Filed Apr. 8, 1965, Ser. No. 446,622
Claims priority, application Canada, Apr. 11, 1964, 900,140
Int. Cl. H02k 7/102; H02p 3/04
U.S. Cl. 318—372     3 Claims

ABSTRACT OF THE DISCLOSURE

Improved circuit controlling apparatus comprises a circuit interrupter and an electric motor operatively connected to the operating member of the circuit interrupter, with brake means automatically biased to a braking position when the motor is deenergized, and with solenoid releasing means in an unactuated position when the motor is deenergized. Control means operates to energize the solenoid means and the motor whereupon the solenoid releasing means is actuated to move the brake means to a non-braking position and whereupon the motor operates to operate the circuit interrupter from one position to another position. Upon operation of the circuit interrupter to the other position the control means operates automatically to deenergize the motor and solenoid releasing means whereupon the brake means operates to brake the deenergized motor. The brake means comprises a pair of brake members biased into braking engagement with a rotating drum, and the solenoid releasing means comprises a solenoid operated wedging member. Upon energization of the motor, the wedging member is operated to wedge the brake members to a non-braking position and upon de-energization of the motor, the wedging member is operated to a non-wedging position by the brake members.

---

Small power motors particularly those which are used for control of apparatus commonly are provided with reduction gearing to enable sufficient torque to be produced by a relatively small horsepower motor. Under such circumstances of course it is necessary that the operation of the motor be completely dependent upon the supply of electrical energy. When the supply is shutoff it will obviously be necessary that the motor be stopped as soon as possible thereafter to prevent inadvertent variable overtravel. In order to minimize the size of brake required for this purpose, it is most convenient to brake the motor shaft rather than the high torque, reduced speed, shaft. Various brakes have been provided in the past for this purpose for example magnetically actuated disc brakes and magnetically actuated drum brakes. In the case of the magnetically actuated disc brake, a specially designed solenoid has to be utilized to pull one disc away from the other. In the case of shoe brakes, if the brake is to be self-centering, the actuating mechanism may become quite complex and in small sizes this becomes difficult to manufacture.

An object of this invention is to provide an improved combination comprising a motor-operated circuit controlling device with electrically operated brake means.

A further object of this invention is to provide improved means for controlling the operation of a circuit interrupter.

These and other objects are attained by mounting a drum on the gear motor shaft. A pair of blocks of suitable material having semicircular openings are mounted so as to surround the drum. Each block is mounted for rotation about a pin and springs are provided to cause the ends of the blocks to move towards each other thus causing the walls of the circular opening formed by the two semicircular openings to grip the drum. Under these circumstances, the brake is holding the drum. To release the brake a wedge member which is freely movable in a plane parallel to the blocks is pulled between the blocks by a solenoid. Due to the freedom of motion in the plane parallel to the block, the wedge member is self-aligning. As the solenoid pulls the wedge between the blocks, it forces the blocks apart and releases the brake. The angle of the wedge is such that, combined with the coefficient of friction of the block material, when the solenoid is deenergized the wedge is forced out from between the blocks by the resilient forces. In this way, the brake is released when the solenoid is energized and is applied when the solenoid is deenergized. By energizing the solenoid at the same time the motor is energized, it will be obvious that the brake is released when the motor is operating and as soon as the motor is deenergized the brake operates to stop the shaft from rotating further. In practice, the drum may conveniently be made of metal while the blocks are made of a suitable friction material. The resilient forces required for forcing the slot together may be provided by springs and these springs ideally are such that they permit the blocks to pivot about suspension points thus permitting the blocks to be free floating and self-centering.

A cleaner understanding of my invention may be had from a consideration of the following drawings and description.

Figure 1:
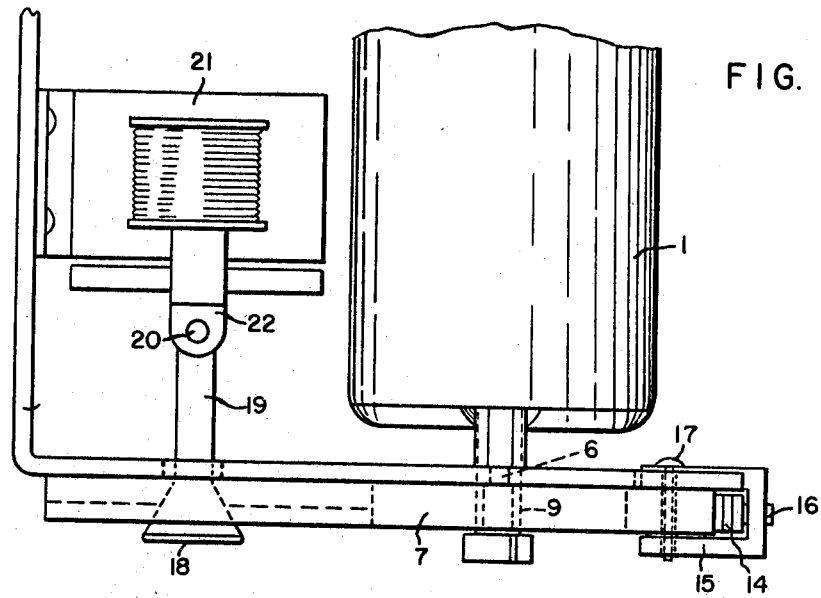
FIGURE 1 is a top plan view of part of a motor and braking structure constructed in accordance with principles of this invention.

In the drawings, it will be seen that a motor 1 has a shaft 2 on which is mounted a drum 3. The drum is locked to a flat on the shaft by means of set screws (not shown). The motor itself is mounted on a bracket 5 by means of bolts 8 which pass through holes 6 in the bracket. On the opposite side of the bracket 5 are mounted blocks 7. It will be noted that the bolts 8 which pass through the holes 9 in the resilient blocks 7 are provided with a shoulder on their shaft and the thread section is of reduced diameter. The length of the shaft from the head of the bolt to the shoulder is greater than the thickness of the blocks thus permitting the blocks to move relative to the bolts 8. Also the diameter of hole 9 is greater than the diameter of the shaft of bolt 8 and the blocks are thus permitted to move primarily in a plane parallel to the surface of the bracket.

The circular opening 10 formed by the blocks is substantially the same diameter as the drum 3 and from this circular opening a gap 11 extends between the edges of the blocks. At gap 11 the edges of the blocks are beveled as shown at 12. A further gap 13 extends in the diametrically opposite direction between the blocks. A spring member comprising two leaf springs 14 is mounted in yoke 15 and prevented from transverse motion by pin 16 which passes through the springs 14 and through the yoke 15. The yoke is retained on the block by means of pins 17 which pass through the yoke and through the block and support the blocks for rotation. It will be seen that a portion of bracket 5 is cut away to accommodate yoke 15. A conical wedge member 18 fits into the gap 11, its conical surface engaging the beveled edges 12 of the blocks. Tang 19 extends from the cone 18 and is connected by means of a pin 20 to the yoke of the solenoid 21. The solenoid 21 is mounted on the opposite face of the bracket 5 by means of suitable mounting bolts and arranged such a distance from the block 7 that the cone rests on the beveled edges when the solenoid is unactuated. The operation of the brake may be explained as follows:

When the motor is energized, the solenoid coil is also energized causing the yoke 22 to be moved toward the solenoid coil, thus pulling the tang 19 and causing the cone 18 to engage the beveled edges of blocks 7. The engagement is sufficient to force the gap open by rotating blocks 7 about pins 17 and enlarging the diameter of opening 10. This enlargement is sufficient to release drum 3 and permit the motor to rotate. If by chance either the drum is eccentric or the blocks are not centered relative to the drum, rotation of the drum will cause the blocks to move about on the pins 17 until the blocks are clear of the drum and permit the drum to rotate freely.

When the motor is deenergized, the solenoid is deenergized permitting the yoke to move back away from the coil. The springs 14 produce a torque about pins 17 causing the two blocks to rotate about the pins 17 causing the gap 11 to close. Since the solenoid no longer restrains the cone 18, the cone is permitted to move back away from the coil and the gap therefore closes until the sides of the hole 10 engage the drum 3. Due to the arrangement of the spring, the force on one side of the drum must be equal to the force on the other side of the drum. Thus the two sides of the opening bear with equal force upon the drum 3. There is no restraint on the blocks since they are free to move transversely on the bolts 8. They are only prevented from rotating with the drum and therefore the restraining torque produced by the frictional engagement of the blocks with the drum 3 is transmitted through the pins 17 to the bracket. The motor therefore is quickly and smoothly brought to a stop. The self-balancing feature of the brake provides that the brake does not grab or chatter and that the wear on the two blocks is essentially equal.

While the specific embodiment shown is the preferred embodiment, various modifications could be provided. For example, the solenoid could conceivably push the cone into the gap rather than pull it into the gap if it were more convenient to arrange the solenoid in that mode. However, the freedom of the cone on the end of tang 19 is of importance to ensure that it aligns freely and properly within the edges. This would be more difficult to accomplish with the push-type operation. The springs 14, shown as causing the closing torque on the blocks, could obviously be provided in varied ways. For example, rather than pushing on the ends of the outside corners of the blocks, springs could be arranged to push the sides of the blocks together with their other surfaces contacting a yoke which spans the blocks. Alternatively a tension spring could be provided at the far end of the blocks to pull the gap closed. With the arrangement shown, however, certain advantages are obtained for example, the spring force can easily be modified by utilizing three or four springs as desired or only one spring if a reduced force is desired. This makes the brake particularly flexible in design. The selection of material of the drum and the blocks obviously will depend upon the type of service for which the brake is intended. Practically the drum is made of metal and the blocks made of some suitable friction material, for example, cloth reinforced resin.

Figure 2:
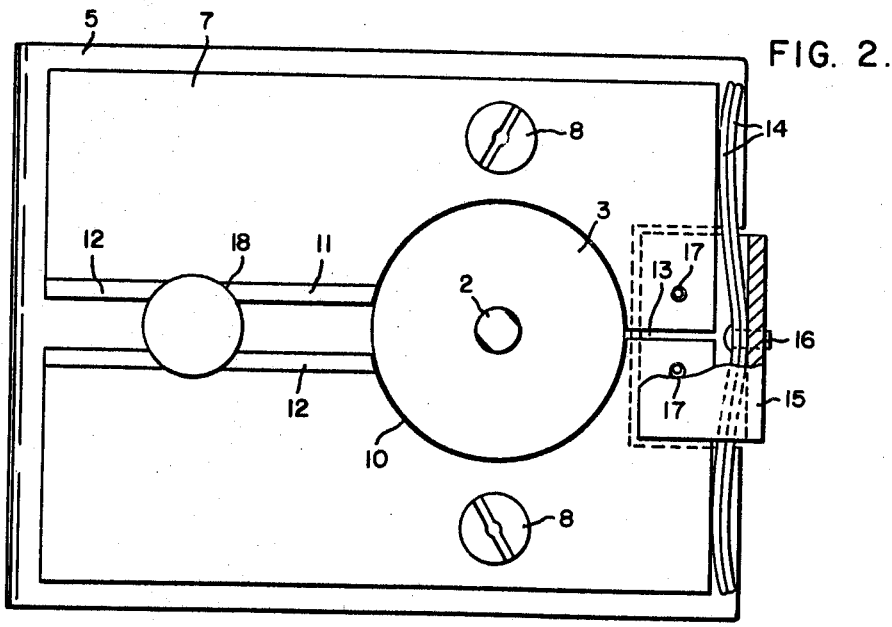
FIG. 2 is a front elevational view, with parts broken away, of the structure disclosed in FIG. 1.
Figure 3:
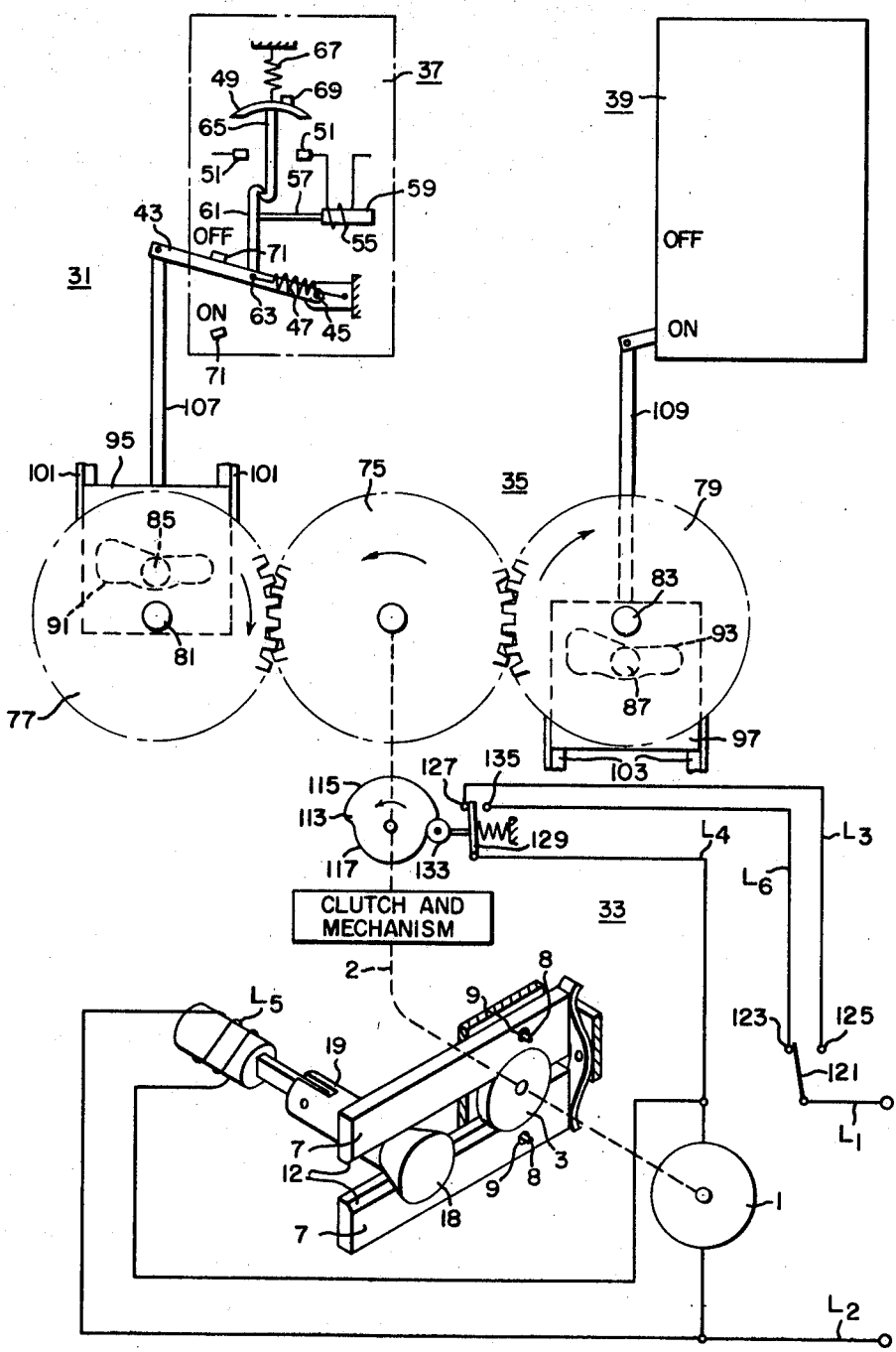
FIG. 3 is a schematic view, with parts shown in perspective, of a transfer switch embodying a motor and braking structure of the type disclosed in FIGS. 1 and 2.

Referring to FIG. 3, there is disclosed therein circuit controlling apparatus 31 comprising a motor operating structure 33, a transfer switch mechanism 35 and two circuit breakers 37, 39. The motor operating mechanism 33 is the same as that hereinbefore described with reference to FIGS. 1 and 2. The transfer switch mechanism 35 is of the type more specifically described in the copending patent application of Robert G. Anderson et al. Ser. No. 394,107, filed Sept. 3, 1964, now Patent No. 3,270,713. Thus, only a brief description of the mechanism 35 is herein provided.

The circuit breakers 37 and 39 are of identical construction and they may be of the type shown in the patent to E. A. Walker et al., Pat. No. 2,798,606. Thus, only a schematic drawing and a brief description of the schematic of the one circuit breaker 37 is given herein. The circuit breaker 37 is of the type known in the art as a molded case type circuit breaker since it comprises an insulating housing indicated in dot-dash lines at 41. The insulating housing 41 is of molded insulating material and it is provided with a suitable opening at the front portion thereof through which the external operating handle 43 extends to permit operation of the circuit breaker. The handle 43 is moved about a pivot 45 to move a spring 47 overcenter to effect opening and closing of contacts 49, 51 in a well known manner. When the contacts 49, 51 are in the closed position and an overload current passes through a tripping coil 55, a plunger 57 of a solenoid 59 is moved against a latch member 61 to pivot the latch member 61 about a pivot 63 to thereby unlatch a contact arm 65 that carries the movable contact 49. Upon release of the contact arm 65, a spring 67 operates to move the contact arm 49 to the open position. The contact 49 is stopped in the open position by means of a stop 69. The circuit breaker is reset by moving the handle 43 to the "off" position to relatch the latch member 61 with the contact arm 65. The circuit breaker is trip-free and even if the handle 43 is held in the closed position the circuit breaker will still be tripped open upon the occurrence of a tripping overload current through the breaker. Stop means 71 are provided to limit movement of the handle 43 in both directions. The circuit breaker 39 is identical to the circuit breaker 37 and it is disposed to be operated to the "off" position when the circuit breaker 37 is operated to the "on" position and to be operated to the "on" position when the circuit breaker 37 is operated to the "off" position.

The circuit breakers 37, 39 are operated by operation of the transfer switch structure 35. The transfer switch structure 35 comprises a center gear 75 supported for rotation with the output shaft 2 of the motor 1. Two operating gears 77 and 79 are supported to rotate about fixed pivots 81 and 83 respectively and they are operatively connected by means of gear teeth to the center gear 75. Operating pins 85 and 87 are supported at the under sides of the gears 77 and 79 respectively. The pins 85 and 87 are disposed in openings 91 and 93 in operating members 95 and 97 respectively. The operating members 95 and 97 are suitably supported for reciprocal rectilinear movement on track means shown partially at 101 and 103 respectively. Elongated operating rods 107 and 109 operatively connect the operating members 95 and 97 respectively to the respective operating handles of the circuit breakers 37 and 39. A cam member 113, comprising an upper cam surface 115 and a lower cam surface 117, is supported for rotation with the output shaft 2.

The circuit controlling apparatus 31 is shown in FIG. 3 with the circuit breaker 37 in the "off" position and with the circuit breaker 39 in the "on" position. Terminal conductors $L_1$ and $L_2$ are connected to a suitable power source. In order to operate the transfer switch, a switch arm 121 is moved out of engagement with a contact 123 and into engagement with a contact 125. This closes a circuit from $L_1$, through the switch arm 121, the contact 125, a line $L_3$, a contact 127, a switch arm 129, a line $L_4$, through the coil of the motor 1 and also through the coil $L_5$ of the solenoid of the brake means, through the line $L_2$. This energizes the unidirectional motor 1 to rotate the output shaft 2 to thereby rotate the center gear 75 of he transfer switch mechanism 35 in a counterclockwise direction. This movement of the center gear 75 operates to rotate the gears 77 and 79 during which movement the pins 85, 87 cooperating in the slots 91, 93 of the members 95, 97 and operate to rectilinearly move the members 95, 97 on the tracks 101, 103 to thereby move the operating rods 107, 109 to operate the circuit breakers 37, 39. This operation operates the circuit breaker 37 from the "off" to the "on" position and the circuit breaker 39 from the "on" to the "off" position. Near the end of this operative movement of the transfer switch structure 35, the cam member 113 moves to move the high part 115 thereof against a roller 133 to thereby move the switch arm 129 out of engagement from the contact 127 and into engagement with a contact 135. This movement of the switch arm 129 opens the circuit through the coil of the motor 1 and through the solenoid coil $L_5$ to stop the circuit controlling apparatus 31 in the actuated position. This movement also prepares the circuit for a subsequent operation. Thereafter, when the switch arm 121 is moved back into engagement with the contact 123, a circuit is closed from the line $L_1$, through the switch arm 121, the contact 123, a line $L_6$, the contact 135, the switch arm 129, the line $L_4$, the coil of the motor 1 and the coil $L_5$ of the solenoid, through the line $L_2$. This subsequent energizing operation operates to operate the transfer switch mechanism 35 to move the operating handles of the circuit breakers 37, 39 back to the initial positions thereof in the same general manner hereinbefore described. Near the end of this operation, the cam member 113 is operated to effect movement of the roller 133 onto the low part 117 of the cam member 113 whereupon the switch arm 129 is spring-biased back into engagement with the contact 127 thereby breaking the energizing circuit and preparing the circuit for another operation. As is described more specifically in the copending application Ser. No. 394,107, filed Sept. 3, 1964, now Patent No. 3,270,713, the controlling circuit can be operated automatically by means of suitable control means such, for example, as suitable voltage sensitive relays.

The coil of the motor and the coil $L_5$ of the brake are simultaneously energized and deenergized. Thus, the brake is actuated to a releasing or non-braking position when the motor is energized and to a braking position when the motor is deenergized. The electrically operated brake structure provides an effective means for braking the operation of the circuit controlling apparatus 31 to thereby prevent undue coasting that would otherwise move the operating handles of the circuit breakers away from the proper actuated positions. The combination provides an improved circuit controlling structure wherein the braking and operating functions of the motor operating mechanism are automatically coordinated for simultaneous operation thereof in an effective and efficient manner.

Since numerous changes may be made in the abovedescribed construction, and because different embodiments of the invention may be made without departing from the spirit and scope of the invention, it is intended that the matter contained in the foregoing description or shown in the accompanying drawings be interpreted as illustrative and not in a limiting sense.

I claim as my invention:

1. Circuit controlling apparatus comprising a circuit interrupter, said circuit interrupter comprising a pair of contacts and an operating member movable between two operating positions to open and close said contacts, a motor operating mechanism operatively connected to said operating member, said motor operating mechanism comprising a motor and a shaft rotatable upon energization of said motor, a brake drum connected to rotate with said shaft, a brake for said rotating brake drum, said brake comprising a pair of brake members positioned in proximity to said drum, each of said brake members comprising an elongated member having a contoured brake surface intermediate the ends thereof, first support means supporting said brake members for movement between a braking position and a non-braking position, biasing means on a first side of said drum biasing said brake members toward each other to bias said contoured brake surfaces into braking engagement with said drum to effect a braking action, solenoid releasing means comprising a solenoid operated wedging member, second support means supporting said solenoid releasing means on a second side of said drum opposite said first side, upon operation of said solenoid releasing means said solenoid operated wedging member being moved in a direction generally parallel to the axis of rotation of said drum to wedge said brake members apart to a non-braking position, control means operable to energize said motor and said solenoid releasing means whereupon said solenoid operated wedging member is moved to wedge said brake members apart to a non-braking position and whereupon said motor operates to move said operating member from one to another of said positions, means operating automatically to deenergize said motor and said solenoid releasing means when said operating member has been operated to said other position whereupon said solenoid releasing means is released and said biasing means biases said brake members toward each other into braking engagement with said drum to effect a braking action.

2. Circuit controlling apparatus according to claim 1, said first support means supporting said brake members such that each of said brake members is supported for generally pivotal floating movement about a separate pivot.

3. Circuit controlling apparatus according to claim 2, and said biasing means comprising leaf-spring means supported at one end of said brake members on said first side of said brake drum to bias said brake members into braking engagement with said brake drum.

References Cited

UNITED STATES PATENTS

| 2,497,794 | 2/1950 | Rehwald | 318—369 X |
| 2,688,719 | 9/1954 | Busquet | 318—372 |
| 2,833,975 | 5/1958 | Currie | 318—369 |
| 2,841,251 | 7/1958 | Shelton. | |
| 3,147,825 | 9/1964 | Barnes. | |
| 2,214,807 | 9/1940 | Buckley. | |

ORIS L. RADER, Primary Examiner

R. J. HICKEY, Assistant Examiner